US000001103H

United States Statutory Invention Registration [19]

[11] Reg. Number: H1103

Decor et al. [43] Published: Sep. 1, 1992

[54] POST EMERGENCE HERBICIDAL COMPOSITIONS AND METHODS FOR USING SAME

[75] Inventors: Jean-Pierre Decor, Thurius, France; Robert E. Holm, Belle Mead, N.J.

[73] Assignee: Rhone-Poulenc Secteur Agrochimie, Lyons, France

[21] Appl. No.: 504,099

[22] Filed: Mar. 31, 1990

Related U.S. Application Data

[63] Continuation of Ser. No. 277,506, Nov. 30, 1988, abandoned, which is a continuation of Ser. No. 946,567, Dec. 24, 1986, abandoned.

[51] Int. Cl.[5] ..... A01N 43/40; A01N 37/34; A01N 37/40

[52] U.S. Cl. ..... 71/94; 71/105; 71/116; 71/106

[58] Field of Search ..... 71/105, 116

[56] References Cited

U.S. PATENT DOCUMENTS

| | | | |
|---|---|---|---|
| Re. 31,455 | 12/1983 | Bayer et al. | 71/116 |
| 3,979,437 | 9/1976 | Theissen | 71/116 |
| 4,063,929 | 12/1977 | Bayer et al. | 71/116 |
| 4,637,830 | 1/1987 | Dyer et al. | 71/105 |

FOREIGN PATENT DOCUMENTS

| | | | |
|---|---|---|---|
| 801071 | 12/1968 | Canada | 71/105 |
| 903256 | 6/1972 | Canada | 71/105 |
| 1182301 | 2/1985 | Canada | 71/105 |
| 0008506 | 3/1980 | European Pat. Off. | 71/105 |
| 1037704 | 2/1986 | Japan | 71/105 |

*Primary Examiner*—Robert L. Stoll
*Assistant Examiner*—Joseph D. Anthony
*Attorney, Agent, or Firm*—Morgan & Finnegan

[57] ABSTRACT

Combinations of a 2-nitro-5 (Substituted phenoxy) benzoic acid or derivative thereof, e.g. sodium acifluorfen with a derivative of 3,5-dihalo-4-hydroxybenzonitrile e.g. 3,5-dibromo-4-hydroxy-benzonitrile (bromoxynil, especially in a salt form), exhibit unexpected synergistic herbicidal activity against several important weed species when applied post-emergence in important agronomic crops.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POST EMERGENCE HERBICIDAL COMPOSITIONS AND METHODS FOR USING SAME

This application is a continuation of Ser. No. 07/277,506, filed Nov. 30, 1988, now abandoned, which is a continuation of co-pending application Ser. No. 06/946,567, filed on Dec. 24, 1986, now abandoned.

BACKGROUND AND FIELD OF THE INVENTION

This invention is concerned with synergistic herbicidal compositions of 2-nitro-5-substituted-phenoxybenzoic acid and derivatives in combination with 3,5-dihalo-4-hydroxybenzonitrile derivatives.

SUMMARY OF THE INVENTION

This invention provides post-emergence herbicidal compositions comprising in synergistic proportion: A. an herbicidally effective amount of a compound or mixture of compounds selected from 2-nitro-5-substituted phenoxybenzoic acids or derivatives or 2-nitro-5-substituted pyridyloxybenzoic acids or derivatives of the general formula:

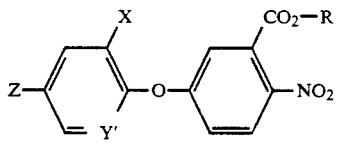

wherein:

X is halogen (e.g., F, Cl, Br);

Y' is —C(Y)=or —N=;

Y is hydrogen or halogen;

Z is a haloalkyl group, preferably having one or two carbon atoms, e.g., halomethyl groups such as trifluoromethyl, trichloromethyl, dichlorofluoromethyl and difluorochloromethyl;

R is hydrogen, an alkali metal (eg., Li, Na, K), an alkaline earth metal (e.g., Mg and Ca), ammonium, alkyl-ammonium, dialkylammonium, etc. or any other agronomically acceptable cation-forming salt, and alkyl of one to four carbon atoms or substituted alkyl groups which provide agronomically acceptable esters of herbicidal effectiveness; and B. a compound selected from 3,5-dihalo-4-hydroxybenzonitrile derivatives of the general formula:

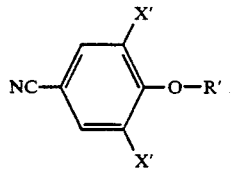

wherein

X' is an iodine or bromine atom, preferably a bromine atom;

R' is hydrogen, an alkali metal (e.g., Li, Na, K), an alkaline earth metal, ammonium, alkylammonium, dialkylammonium, etc. or any other agronomically acceptable cation forming salt, or an alkanoyl (—$COR^2$) group, wherein $R^2$ is an alkyl group of one to twenty saturated or unsaturated carbon atoms.

The invention also provides methods for controlling the growth of weeds by post-emergence application of the foregoing herbicidal compositions.

DESCRIPTION OF SPECIFIC EMBODIMENTS

The first active ingredient of the herbicidal synergistic compositions of this invention is a 2-nitro-5-substituted phenoxy (or pyridyloxy) benzoic acid or derivative, i.e., an acid, salt or ester, but which preferably is a salt of 5-[2'-chloro-4'-(trifluoromethyl)-phenoxy]-2-nitro-benzoic acid and especially is the sodium salt thereof (the known herbicide sodium acifluorfen). Examples of this active ingredient (hereinafter "compound A") are described in U.S. Pat. Nos. 3,979,437 and 4,063,929 (RE 31,455) which are incorporated herein by reference. Examples of the said pyridyloxy benzoic acids or derivatives are described in, for example Published European Patent Application No. 24,259, also incorporated herein by reference.

The second active component (hereinafter "Compound B") of the herbicidal composition is a 3,5-dihalo-4-hydroxy-benzonitrile or derivative thereof such as the free phenol itself, or preferably a salt or an alkanoylated ester. These compounds are described in Canadian patents 801071 and 903256, incorporated herein by reference.

The primary dihalohydroxybenzonitrile derivatives contemplated in the invention are the agronomically acceptable salts (especially sodium or potassium salts) and the esters of alkanoic acids of 3,5-dibromo-4-hydroxybenzonitrile (e.g. the known herbicide bromoxynil). The esters may be, for example, butyrate, heptanoate, octanoate or combination thereof such as heptanoate/octanoate or octanoate/butyrate.

APPLICATION METHODS AND USES

The herbicidally active components of the compositions of this invention may be combined in ratios most useful to the particular weed problem to be controlled. For example, the ratio of compound A (e.g. sodium acifluorfen) to compound B (e.g. bromoxynil derivative) can be in the range of 0.1 to 10, but is most preferably in the range of 0.3 to 3. The use rates of individual compounds also vary according to the particular weed control desired and can be from 25 to 1000 g/ha, but are most preferably between 140 and 420 g/ha. Practically the dose of each compound is such that the mixture is applied in a herbicidally effective amount which is selective for the crop.

When the compositions of this invention are applied to soybean crops, the use rates of active ingredients together (compound A +compound B) is preferably between 280 and 600 g/ha, more preferably between 400 and 600 g/ha; in the latter range, the ratio of compound A to compound B is preferably from 1 to 3.

The compounds may be combined either by tank mix or premix (as described in the formulation section) to give the herbicidal compositions of this invention. These compositions may be applied by any of several application techniques, by a broadcast treatment, in a narrow band over the growing row of the crop, or by any other directed application (e.g. spray) technique wherein said application is made primarily to the weeds with minimal contact to the crops. The latter technique provides the desired synergistic herbicidal weed control while protecting crops which are not normally or sufficiently tolerant to one or both of the active ingredients in the herbidical composition. For example, as shown in the subsequently described tests, sunflower (HEL) is controlled to a high degree by the active compounds A and B. Such activity is desirable where sunflower grows as a weed in a soybean field. However, sunflower is also grown as a crop and by means of the above described directed application techniques, sunflower will be substantially free from injury while benefiting from a high level of weed control.

In addition to the use of the above described tank-mix or pre-mixed compositions the benefit of the present invention can be obtained by separately applying the active compounds A and B to the locus of the weeds and/or crop in such manner wherein the period of time between their individual application is relatively short (e.g. one day). For example, a compound A can be applied post-emergence followed by the application of a compound B, or visa-versa.

Applications may be made by any one of the above application techniques to many different crops, including, for example, soybean, corn, cotton, peanuts, rice, small grains, etc. Application to soybean is a highly preferred feature of the invention especially in view of the good selectivity of compositions of the invention on soybean crop. Furthermore a particularly preferred feature of the invention is the application of the compositions of the invention to an area particularly infested by or which is likely to be particularly infested by such weeds as Hempsesbania, Prickly sida, Lambsquarter.

FORMULATIONS

When the invention is used in practice, the herbicidal compositions according to the invention frequently contain one or more ingredients other than the active ingredient compounds A and B. These herbicidal compositions, contain the active ingredients according to the invention, such as described earlier, in combination with agriculturally acceptable solid or liquid carriers and surface-active agents, which are also agriculturally acceptable. Conventional carriers and surface-active agents can be employed. These compositions also form part of the invention and/or can be used in the invention.

These compositions may also contain other ingredients conventional in herbicidal compositions, such as, for example, protective colloids, adhesives, thickeners, thixotropic agents, penetrating agents, adjuvants or activators, stabilizers, sequestering agents, fertilizers or the like, as well as other known active ingredients with pesticidal properties (particularly herbicides) or with properties regulating the growth of plants. More generally, the composition employed in the invention may contain all the solid or liquid additives corresponding to the usual techniques of formulation.

In the following discussion, unless otherwise indicated, percentages are by weight.

The adjuvants or activators are compounds which are normally non-phytotoxic at normal doses (0.5 to 5 kg/ha) but which are able to substantially enhance the herbicidal activity of the active Compounds A and B or of their mixtures. Most of these activators are known per se. Some activators are surfactants as hereafter described, especially polyethoxylated derivatives of phenol, alcohol, amines. Other activators are nitrogen-providing fertilizers. They are of high interest in the invention because they substantially increase the activity of compositions of the invention. Fertilizers containing 5 to 40% of available nitrogen (generally in the form of ammonium cations or also in the form of nitrate anions) are very useful.

Some activators are ammonium salts especially chloride, sulfate, nitrate, inorganic or organic ammonium phosphates. Other activators can be used. The amount of activator(s) used in the compositions of the invention may be between 0.1% and 5000% of the amount of the active ingredients (e.g. acifluorfen and dihalohydroxybenzonitrile). When the activator is a nitrogen providing fertilizer, the amount of fertilizer is preferably between 3 and 30 times the amount of so-called active ingredients. This percentage or amount depends also on the particular nature of the activators used. The proportions indicated thereafter in the compositions of the invention are given without inclusion of these activators.

The use doses of the compounds employed in the invention can vary within wide limits, particularly depending on the nature of the plants to be eliminated and/or the degree of infestation of weeds.

In general, the compositions according to the invention usually contain approximately 0.05 to 95% of one or more compounds from each class of active compounds according to the invention, approximately 1 to 95% of one or more solid or liquid carriers and, optionally, approximately 0.1 to 50% of one or more surface-active agents.

In accordance with what has already been stated, the active ingredients employed in the invention are generally combined with carriers and, optionally, surface-active agents.

In the present account, the term "carrier" denotes an organic or inorganic ingredient, natural or synthetic, with which the active ingredients are combined to facilitate application to the plant, to seeds or to the soil. This carrier is therefore generally inert and it must be agriculturally acceptable, particularly to the treated plant. The carrier may be solid (clays, natural or synthetic silicates, silica, resins, waxes, solid fertilizers, and the like) or liquid (water, alcohols, particularly butanol; esters particularly methylglycol acetate; ketones, particularly cyclohexanone and isophoron; petroleum fractions; paraffinic or aromatic hydrocarbons, particularly xylenes; aliphatic chlorinated hydrocarbons, particularly trichloroethane, or aromatic chlorinated hydrocarbons, particularly chlorobenzenes; water-soluble solvents such as dimethylformamide, dimethyl sulphoxide, or N-methylpyrrolidone; liquefied gases, and the like).

The surface-active agent may be an emulsifying agent, dispersing agent or wetting agent of the ionic or non-ionic type or a mixture of surface active agents. There may be mentioned, e.g., salts of polyacrylic acids, salts of lignosulfonic acids, salts of phenolsulphonic or napthalenesulphonic acids, polycondensates of ethylene oxide with fatty alcohols or fatty acids or fatty amines, substituted phenols (particularly alkylphenols or arylphenols), salts of sulphosuccinic acid esters, taurine derivatives (particularly alkyltaurates), phosphoric esters of alcohols or of polycondensates of ethylene oxide with phenols, esters of fatty acids with polyols, and sulphate, sulphonate and phosphate functional derivatives of the above compounds. The presence of at least one surface-active agent is generally very advantageous and even essential when the specific dihalohydroxybenzonitrile derivative used in the invention and/or the inert carrier are only slightly water-soluble or are not water-soluble and the carrier in the composition is water.

For their application, the active ingredients used in the invention are preferably in the form of premixed combinations/compositions. These compositions according to the invention are themselves either in solid form or in liquid form. Liquid forms are preferred when the dihalohydroxybenzonitrile derivative is a bromoxynil salt. Solid forms are preferred when the dihalohydroxybenzonitrile derivative is a bromoxynil ester. Premixed concentrate compositions are preferred in the invention because of their convenience, being in one package and because they are less subject to mixing errors and potential compatibility problems.

The liquid concentrated formulations or solutions containing bromoxynil salt(s) are a preferred feature of the invention; they are of special interest because of their low phytotoxicity on soybean.

Solid forms of compositions which can be mentioned are dusting powders (with a content of active ingredients capable of ranging up to 80%) and wettable powders and soluble powders and dry flowables and pastes and water dispersible granules, particularly those obtained by extrusion, compacting, impregnation of a granular carrier, or granulation starting from a powder (the content of active ingredients in these granules being between 0.5 and 80% in these latter cases).

The wettable or soluble Powders (or powder for spraying) are usually prepared so that they contain 10 to 80% of active ingredient, and they usually contain, in addition to the solid carrier, from 0 to 5% of a wetting agent, from 3 to 10% of a dispersing agent, and when necessary, from 0 to 80% of one or more stabilizers and/or other additives such as penetrating agents, adhesives, or anti caking agents, colorants, or the like. Practically it is preferred to mix solid acifluorfen sodium (in the form of powder) with the bromoxynil ester impregnated on a carrier or in the form of wettable powder of dispersible granules.

The "water dispersible granules (WG)" (granules which are readily dispersible in water) have a composition which is substantially close to that of the wettable powders. They may be prepared by granulation of formulations described for the wettable powders, either by a wet route (contacting finely divided active ingredient with the inert filler and a little water. e.g. 1 to 20%, or with an aqueous solution of dispersing agent or binder, followed by drying and screening), or by a dry route (compacting followed by grinding and screening). The solid granules can have a diameter, for example, from 0.25 to 1 mm. Additives, such as described for used in wettable powders, may be used with granules. In lieu of solid supports, a hydrophilic organic solvent such as a glycol derivative can be employed.

Liquid forms of premixed concentrated combinations/compositions of the invention are solutions or emulsions (in water or in organic solvents), water soluble concentrates, emulsifiable concentrates, flowables.

The solutions or water soluble concentrates (powder or granules especially) also comprise most frequently 5 to 80% of active ingredients, while the emulsions or solutions which are ready for application generally contain, 0.01 to 20% of active ingredients. Besides the solvent, the solutions or concentrates may contain, when required, 2 to 50% of suitable additives, such as stabilizers, surface-active agents, penetrating agents, corrosion inhibitors, colorants or adhesives.

Emulsions of any required concentration, which are particularly suitable for application to plants, may be obtained from these concentrates by dilution with water Flowables, which can also be applied by spraying, are prepared so as to obtain a stable fluid product which does not settle, and they usually contain from 10 to 75% of active ingredients, from 0.5 to 15% of surfactants, from 0.1 to 10% of thixotropic agents, from 0 to 10% of suitable additives such as antifoams, corrosion inhibitors, stabilizers, penetrants and adhesives and, as a support, water or an organic liquid in which the active substance is of low solubility of insoluble: some solid organic substances or inorganic salts can be dissolved in the support to assist in preventing sedimentation, or as antifreeze for the water.

As already stated, the dispersions and aqueous emulsions, e.g. the compositions obtained by diluting with water, a solid or liquid concentrated premixed composition according to the invention, are included within the general scope of the present invention. The emulsions can be of the water-in-oil or oil-in-water type, and they can have a thick consistency like that of "mayonnaise".

All of these diluted aqueous dispersions of solutions or spraying mixtures can be applied to the growth area of the crops to be weeded, by any suitable means, chiefly by spraying, at the rates which are generally in the order of 100 to 1,200 liters of spraying mixture per hectare.

The water diluted compositions according to the invention are conveniently applied to vegetation and in particular to weeds to be eliminated when the latter have green foliage.

HERBICIDAL EFFECTIVENESS

Two groups of herbicidal experimentations, conducted under open field conditions, show the effectiveness of the active compounds in various combinations.

Among the weed/crop species used in these tests were:

| | |
|---|---|
| Soybeans: | GLX-*Glycine max* |
| Sunflower: | HEL-*Helianthus annus* |
| Velvetleaf: | ABU-*Abutilon theophrasti* |
| Pigweed: | AMA-Amaranthus species |
| Large crabgrass: | DIG-*Digitaria sanguinalis* |
| Barnyardgrass: | ECH-*Echinochloa crus-galli* |
| Morningglory: | IPO-Ipomoea species |
| Hempsesbania: | SEB-*Sesbania exaltata* |
| Giant foxtail: | SETF-*Setaria faberi* |
| Green foxtail: | SETV-*Setaria viridis* |
| Prickly Sida: | SID-*Sida spinosa* |
| Common cocklebur: | XAN-*Xanthium pensylvanicum* |
| Lambsquarter: | CHE-*Chenopodium album* |

Compound/formulations used in the experimentation:

I. Sodium acifluorfen (compound A) was used as an aqueous formulation (240 g/1=2 lb/gal =21.1% w/w; with ),0,3% antifoam agent). The rates were based on the sodium salt active ingredient.

II. Bromoxynil was used either as: (A) an aqueous formulation of the potassium salt (compound B1; example 1; made by mixing 5.9 parts of 3,5 dibromo-4-hydroxybenzonitrlle and 1.2 part of KOH and 5.7 parts of N-methyl pyrrolidine and 87 parts of water) or (B) as the octanoate ester (compound B2; example 2; formulation made by mixing 33.4 parts of 4-cyano-2,6-dibromophenyl octanoate and 10% of mixture of nonionic and anionic surfactants (copolycondensate of ethylene oxide; calcium alkylarylsulfonate) and xylene up to 100 parts. or (C) as the phenol (compound B3; example 2; formulation made by mixing 56.25 parts of 3,5-dibromo-4-hydroxy-benzonitrile and 5 parts of propylene glycol and 4.3 parts of wetting and dispersing agents and 2 parts of attapulgite (sickening agent) and water up to 100 parts).

In all cases, the rates for bromoxynil are on the basis of the free phenol itself as if it is the active ingredient. Compounds were combined as a tank mix in the spray tank.

DETERMINATION OF SYNERGISTIC ACTIVITY

One technique for determining whether a particular combination of compounds produces unexpected synergistic herbicidal activity, rather than simple additive activity is made by means of applying the well established Colby formula [(S. R. Colby, Weeds, Vol. 15, p. 20–22 (1967)]:

$$E=A+B-AB/100$$

wherein:

A = the percent weed control exhibited by compound A at the rate of X g ai/ha

B = the percent weed control exhibited by compound B at the rate of Y g ai/ha

E = the percent expected weed control by calculation for the combination of compounds A + B at the rates of X and Y, respectively.

Although sufficient data are not presented herein to make such calculations, it is believed that the compositions of the present invention exhibit synergistic herbicidal properties against some troublesome weeds.

EXAMPLE 1

For each experiment, 2 replications were made on 2 m × 4 m plots on clay soil. The weed/crop species were planted in rows the length of the plot at 18 cm spacings. Application: the formulated compounds were applied in 200 liters/hectare (about 20 gal/acre) of water as a post-broadcast (post emergence) application perpendicular to the planting direction. This application was made 21 days after planting at which time the plants were in the following stage of growth.

| Species | No of leaves | Ht, cm | Row cover, % |
|---|---|---|---|
| GLX | 3rd triff. | 7–10 | 100 |
| SEB | 6 | 15 | 100 |
| SID | 3–4 | 5 | 45 |

Rating evaluations: the % controls as reported in table 1 are based upon visual observations consistent with controls and standards and are the average of two replications. Ratings were made at 6 and 13 days after treatment (DAT). Unexpected synergistic results are observed showing additional control. Synergistic activity is particularly evident on SEB (Hemp sesbania) and SID (Prickly sida).

EXAMPLE 2

For each experiment, 3 replications were made on 2 m × 3 m plots in sand soil. The chenopodium species was planted in rows the length of the plot at 18 cm spacings. Application: the formulated compounds were applied in 187 liters/hectare (about 20 gal/acre) of water as a post-broadcast (post emergence) application perpendicular to the planting direction. This application was made 23 days after planting at which time the plants were in the following stage of growth:

| No of leaves | Ht, cm | Row cover, % |
|---|---|---|
| 4–5 | 2–3 | 20 |

Rating evaluations: the % controls as reported in table 3 are based upon visual observations consistent with controls and standards and are the average of 3 replications. Ratings were made at 4 and 14 days after treatment (DAT). Unexpected synergistic results are observed showing additional control, being particularly evident on CHE (Lambsquarter). Both formulations of bromoxynil (the octanoate ester and free phenol) in combination with sodium acifluorfen show synergistic activity.

EXAMPLE 3

A ready-mix is made with sodium acifluorfen and bromoxynil as the sodium salt in the ratio 1:1

| Component | Parts, wt/wt % |
|---|---|
| Sodium 5-[2'-chloro-4'-(trifluoromethyl) phenoxy]-2-nitrobenzoate (360 g/l aqueous) | 36.28 |
| 3,5-dibromo-4-hydroxybenzonitrile | 10.41 |
| Sodium hydroxide | 1.49 |
| N-methyl-2-pyrrolidone | 25.76 |
| Water | 26.06 |
| | 100.00 |

TABLE 1

HERBICIDAL EVALUATIONS WITH SODIUM ACIFLUORFEN AND BROMOXYNIL FORMULATION

| Treatment Compound(s) | Rate g.ai/ha | % Control GLX | SEB | SID |
|---|---|---|---|---|
| (Rating No 1; 6 days after treatment) | | | | |
| A + B1 | 280 + 140 | 6 | 80 | 80 |
| A + B1 | 280 + 280 | 10 | 93 | 90 |
| A + B1 | 280 + 420 | 9 | 80 | 80 |
| A + B1 | 280 + 560 | 4 | 88 | 83 |
| A + B1 + 28% nitrogen fertilizer | 280 + 140 + 8962 | 5 | 92 | 90 |
| (Rating No 2; 13 days after treatment) | | | | |
| A + B1 | 280 + 140 | 8 | 93 | 90 |
| A + B1 | 280 + 280 | 10 | 97 | 95 |
| A + B1 | 280 + 420 | 8 | 93 | 95 |
| A + B1 | 280 + 560 | 3 | 95 | 93 |

TABLE 2

HERBICIDAL EVALUATIONS WITH SODIUM ACIFLUORFEN AND BROMOXYNIL FORMULATION

| Treatment Compound(s) | Rate g.ai/ha | CHE |
|---|---|---|
| (Rating No 1; 4 days after treatment) | | |
| A + B2 | 140 + 140 | 97 |
| A + B2 | 140 + 280 | 100 |
| A + B2 | 140 + 420 | 100 |
| A + B2 | 280 + 140 | 100 |
| A + B2 | 280 + 280 | 99 |
| A + B2 | 280 + 420 | 100 |
| A + B2 | 420 + 140 | 100 |
| A + B2 | 420 + 280 | 100 |
| A + B2 | 420 + 420 | 100 |
| A + B3 | 140 + 140 | 65 |
| A + B3 | 140 + 280 | 100 |
| A + B3 | 140 + 420 | 100 |
| A + B3 | 280 + 140 | 78 |

TABLE 2-continued

HERBICIDAL EVALUATIONS WITH SODIUM ACIFLUORFEN AND BROMOXYNIL FORMULATION

| Treatment Compound(s) | Rate g.ai/ha | CHE |
|---|---|---|
| A + B3 | 280 + 280 | 100 |
| A + B3 | 280 + 420 | 100 |
| A + B3 | 420 + 140 | 95 |
| A + B3 | 420 + 280 | 100 |
| A + B3 | 420 + 420 | 100 |
| (Rating No 2; 14 days after treatment) | | |
| A + B2 | 140 + 140 | 99 |
| A + B2 | 140 + 280 | 100 |
| A + B2 | 140 + 420 | 100 |
| A + B2 | 280 + 140 | 100 |
| A + B2 | 280 + 280 | 100 |
| A + B2 | 280 + 420 | 100 |
| A + B2 | 420 + 140 | 100 |
| A + B2 | 420 + 280 | 100 |
| A + B2 | 420 + 420 | 100 |
| A + B3 | 140 + 140 | 33 |
| A + B3 | 140 + 280 | 99 |
| A + B3 | 140 + 420 | 100 |
| A + B3 | 280 + 140 | 53 |
| A + B3 | 280 + 280 | 99 |
| A + B3 | 280 + 420 | 100 |
| A + B3 | 420 + 140 | 97 |
| A + B3 | 420 + 280 | 100 |
| A + B3 | 420 + 420 | 100 |

What is claimed:

1. A herbicidal composition consisting essentially of:

A. A compound selected from 2-nitro-5-substituted phenoxybenzoic acids, salts and alkyl esters thereof and 2-nitro-5-substituted pyridyloxybenzoic acids, salts and alkyl esters thereof of the following formula:

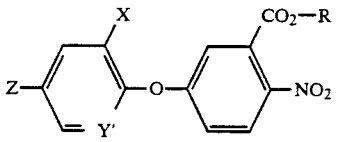

wherein:

X is halogen; Y' is C(Y) or N;

Y is hydrogen or halogen; Z is a halo-alkyl group of one or two carbon atoms;

R is selected from hydrogen, alkali metal and alkaline earth metal;

B. A compound selected from 3,5-dihalo-4-hydroxybenzonitrile derivatives of the formula

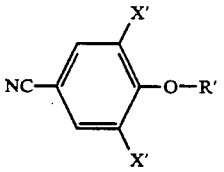

wherein X' is an iodine or bromine atom, preferably a bromine atom; R' is hydrogen, an alkali metal (e.g., Li, Na, K) an alkaline earth metal, ammonium, alkylammonium, dialkylammonium, or any other agronomically acceptable cation forming salt, or an alkanoyl (—COR$^2$) group wherein R$^2$ is an alkyl group of one to twenty saturated or unsaturated carbon atoms, wherein the weight ratio of the Compound A to Compound B component is in the range of 0.3 to 3.

2. A herbicidal composition according to claim 1 wherein Compound A is selected from the class of compounds defined by Y' being —CH=, X being chloro and Z being trifluoromethyl.

3. A herbicidal composition according to claim 2 wherein Compound A is selected from the class of compounds defined by R being an alkali metal.

4. A herbicidal composition according to claim 3 wherein Compound A is sodium acifluorfen.

5. A herbicidal composition according to claim 1 wherein Compound B is selected from the class of compounds defined by X' being bromo and R' being hydrogen, an alkali metal or —COR$^2$.

6. A herbicidal composition according to claim 5 wherein R$^2$ is an alkyl group having eight carbon atoms.

7. A herbicidal composition according to claim 4 wherein Compound B is selected from the class of compounds defined by X' being bromo, R' being hydrogen, an alkali metal or —COR$^2$ wherein R$^2$ is an alkyl group having eight carbon atoms.

8. A herbicidal composition according to claim 7 wherein R' is potassium.

9. A method of controlling weed species in a growth medium for soybeans, said method comprising applying post-emergence to said soybeans and said weed species, a herbicidally effective quantity of a composition consisting essentially of:

A. a 2-nitro-5-substituted phenoxybenzoic acid, salt or alkyl ester thereof or a 2-nitro-5-substituted pyridyloxybenzoic acid, salt or alkyl ester of the following formula:

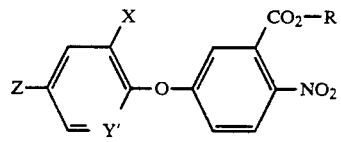

wherein X is halogen; Y' is C(Y) or N; Y is hydrogen or halogen; Z is a haloalkyl group of one or two carbons; R is selected from hydrogen, alkali metal, and alkaline earth metal; and B. a 3,5-dihalo-4-hydroxy-benzonitrile derivative of the formula:

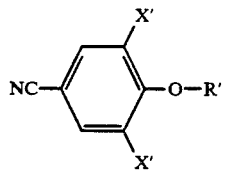

wherein X' is an iodine or bromine atom, preferably a bromine atom; R' is hydrogen, an alkali metal (e.g., Li, Na, K) an alkaline earth metal, ammonium, alkylammonium, dialkylammonium, or any other agronomically acceptable cation forming salt, or an alkanoyl (—COR$^2$) group wherein R$^2$ is an alkyl group of one to twenty saturated or unsaturated carbon atoms wherein the weight ratio of the Compound A component to Compound B component is in the range of 0.3 to 3.

10. A method according to claim 9 wherein Compound A is sodium acifluorfen and Compound B is selected from the class of compounds defined by X' being bromo and R' being hydrogen, potassium or —$COR^2$ wherein $R^2$ is an alkyl group having from 4 to 8 carbon atoms.

11. A method according to claim 10 wherein said herbicidal composition is a tank mix.

12. A method according to claim 10 wherein said herbicidal composition is a premix.

13. A method according to claim 10 wherein the use rate of Compound A and Compound B together in said herbicidal composition is from about 280 g/ha to about 600 g/ha.

14. A method according to claim 10 wherein said composition is applied in a broadcast treatment method.

15. A method according to claim 13 wherein the rate is from about 400 to about 600 g/ha.

16. A herbicidal composition consisting essentially of:

A. a phenoxy-benzoic acid or salt thereof; and

B. bromoxynil, wherein the weight ratio of Component A to Component B is in the range of about 0.3 to 3.

* * * * *